United States Patent
Yamaguchi et al.

(10) Patent No.: US 12,122,616 B2
(45) Date of Patent: Oct. 22, 2024

(54) WORKPIECE TRANSFER SYSTEM

(71) Applicant: FANUC CORPORATION, Yamanashi (JP)

(72) Inventors: Shunji Yamaguchi, Yamanashi (JP); Hideyuki Watanabe, Yamanashi (JP); Yuuki Katou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 266 days.

(21) Appl. No.: 17/782,373

(22) PCT Filed: Jan. 6, 2021

(86) PCT No.: PCT/JP2021/000175
§ 371 (c)(1),
(2) Date: Jun. 3, 2022

(87) PCT Pub. No.: WO2021/141039
PCT Pub. Date: Jul. 15, 2021

(65) Prior Publication Data
US 2023/0010518 A1    Jan. 12, 2023

(30) Foreign Application Priority Data
Jan. 9, 2020    (JP) .................................. 2020-001792

(51) Int. Cl.
*B65G 47/90*    (2006.01)
*B25J 9/16*    (2006.01)

(52) U.S. Cl.
CPC .......... *B65G 47/905* (2013.01); *B25J 9/1633* (2013.01)

(58) Field of Classification Search
CPC .............................. B25J 9/1633; B25J 13/085
See application file for complete search history.

(56) References Cited

U.S. PATENT DOCUMENTS

2011/0320038 A1* 12/2011 Motoki ................ B25J 19/0008
    901/46
2012/0004774 A1*  1/2012 Umetsu .................. B25J 9/1697
    700/254
(Continued)

FOREIGN PATENT DOCUMENTS

CN    105082155 A    11/2015
JP    S60-99588 A     6/1985
(Continued)

OTHER PUBLICATIONS

International Search Report mailed Mar. 23, 2021, in corresponding to International Application No. PCT/JP2021/000175; 5 pages (with English Translation).
(Continued)

*Primary Examiner* — Khoi H Tran
*Assistant Examiner* — Tristan J Greiner
(74) *Attorney, Agent, or Firm* — Maier & Maier, PLLC (57) ABSTRACT

A work transfer system includes a robot having a hand which holds a workpiece and a sensor which can detect external force acting on the hand, a balancer connected to the hand and can generate lifting force for lifting the hand in a vertically upward direction, a shape measuring device which conducts measuring of a shape of the workpiece, and a controller controlling the robot and the balancer based on the shape of the workpiece, and the controller adjusts a holding position of the workpiece by the hand based on the shape, and controls the lifting force so that an absolute value of the external force in the vertical direction detected by the sensor becomes equal to or smaller than a predetermined first threshold when the workpiece is held at the adjusted holding position and lifted.

4 Claims, 9 Drawing Sheets

(56) References Cited

U.S. PATENT DOCUMENTS

| | | | | |
|---|---|---|---|---|
| 2013/0173058 A1* | 7/2013 | Seo | ........................ | B25J 13/085 |
| | | | | 700/260 |
| 2018/0345503 A1* | 12/2018 | De Magistris | ......... | G01B 21/16 |
| 2019/0094017 A1* | 3/2019 | Wakabayashi | ......... | B25J 9/1697 |

FOREIGN PATENT DOCUMENTS

| | | | | |
|---|---|---|---|---|
| JP | S6099588 A1 * | 6/1985 | | |
| JP | H11-58287 A | 3/1999 | | |
| JP | 2008-049459 A | 3/2008 | | |
| JP | 2009-178829 A | 8/2009 | | |
| JP | 2012139769 A * | 7/2012 | ............ | B25J 13/085 |
| JP | 2013-082041 A | 5/2013 | | |
| WO | 2010104157 A1 | 9/2010 | | |
| WO | 2017002266 A1 | 1/2017 | | |

OTHER PUBLICATIONS

Specification (partial) of Digital Ultrasonic Sensor FW Series, Keyence Corporation, Osaka, Japan, Retrieved from the Internet in Nov. 2019, URL: https://www.keyence.co.jp/products/sensor/ultrasonic/fw/specs/.; 1 page (with Machine-Generated English Translation).

* cited by examiner

WORKPIECE TRANSFER SYSTEM

FIELD

This disclosure relates to a workpiece transfer system.

BACKGROUND

A known system assists a robot in a manner that a balancer lifts a workpiece by using force depending on weight of the workpiece when the robot transfers the workpiece held by a hand attached to a distal end of the robot (See International Patent Application, Publication No. 2010/104157, for example).

SUMMARY

An aspect of this disclosure is a workpiece transfer system including a robot which has a hand for holding a workpiece at a distal end of the robot and which has a sensor capable of detecting external force acting on the hand; a balancer which is connected to the hand and which is capable of generating lifting force for lifting the hand in a vertically upward direction; a shape measuring device which conducts measuring of a shape of the workpiece; and a controller which controls the robot and the balancer based on the shape of the workpiece measured by the shape measuring device, wherein, the controller adjusts a holding position of the workpiece by the hand based on the shape of the workpiece measured by the shape measuring device, and controls the lifting force generated by the balancer so that an absolute value of the external force in a vertical direction detected by the sensor becomes equal to or smaller than a predetermined first threshold.

DETAILED DESCRIPTION OF THE EMBODIMENTS

In conventional workpiece transfer systems, when a holding position of a workpiece by a hand is not appropriate, an appropriate balanced state cannot be achieved by a balancer. However, when handling many kinds of workpieces, it needs huge volume of work to measure and register information related to weights and holding positions of the many kinds of workpieces. Therefore, in a case, it is desired to transfer the workpieces by holding the appropriate holding position without registration of the information such as the holding positions of the workpieces and the like beforehand.

A workpiece transfer system 1 according to a first embodiment of the present disclosure will be described below with reference to the accompanying drawings.

Figure 1:
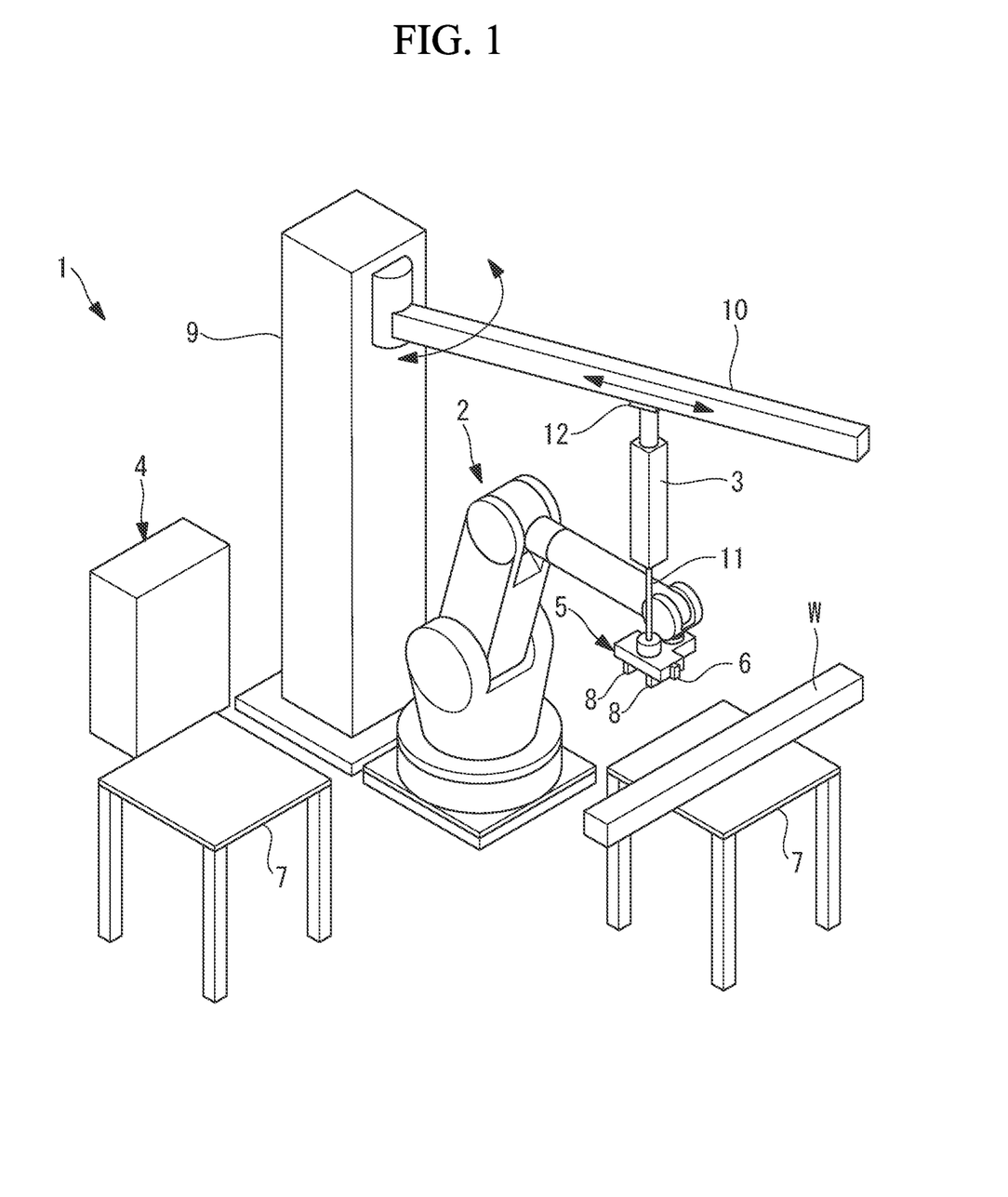
FIG. 1 is a configuration view of an entire workpiece transfer system according to a first embodiment of the present disclosure.

As shown in FIG. 1, the workpiece transfer system 1 according to this embodiment includes a robot 2, a balancer 3, and a controller 4.

The robot 2, for example, is a vertical 6-axis articulated robot having a hand 5 capable of holding a workpiece W at a distal end thereof. A force sensor (a sensor) capable of detecting external force acting on the hand 5 is provided in the robot 2. Also, a camera (a shape measuring device) 6 capable of capturing images of the workpiece W is provided in the hand 5.

The workpiece W is a long member whose cross-sectional shape is uniform, for example. The hand 5 has a pair of claw portions 8 capable of an open-and-close movement so that the claw portions 8 can grasp, in a horizontal direction, to hold the workpiece W at any position located in a longitudinal direction, when the workpiece W is placed on a mounting surface of a work support 7, such as a table and the like. The force sensor can detect external force in three axis lines and moments around the three axis lines in an orthogonal coordinate system having a tool center point (TCP) as the original position of the orthogonal coordinate system, the tool center point is set at a center portion of the pair of claw portions 8, for example.

For example, the balancer 3 is hanged from a cantilever beam 10 which is supported by a column 9 located at a position in the vicinity of the robot 2, and the balancer 3 is an air cylinder which is provided so that a rod 11 can be protruded and retracted in a vertical downward direction. A distal end of the rod 11 is attached to the hand 5. When the rod 11 of the balancer 3 is driven in a direction for lifting the rod 11, lifting force toward the vertically upward direction can be applied to the hand 5. The cantilever beam 10 is provided so as to be rotatable around a vertical axis line extending in a longitudinal axis direction of the column 9.

Also, the balancer 3 is fixed to a slider 12 which is supported so as to be movable along a longitudinal direction of the cantilever beam 10. Accordingly, when the robot 2 moves, the balancer 3 is kept in a state where the balancer 3 is located at a position vertically above the hand 5 by rotation of the cantilever beam 10 and movement of the slider 12, therefore, the lifting force can act on the hand 5 regardless of the posture of the robot 2.

For example, the camera 6 can obtain images including shapes of the workpieces W in a plan view by obtaining images of the workpieces W from a position located vertically above the workpieces W.

Figure 2:
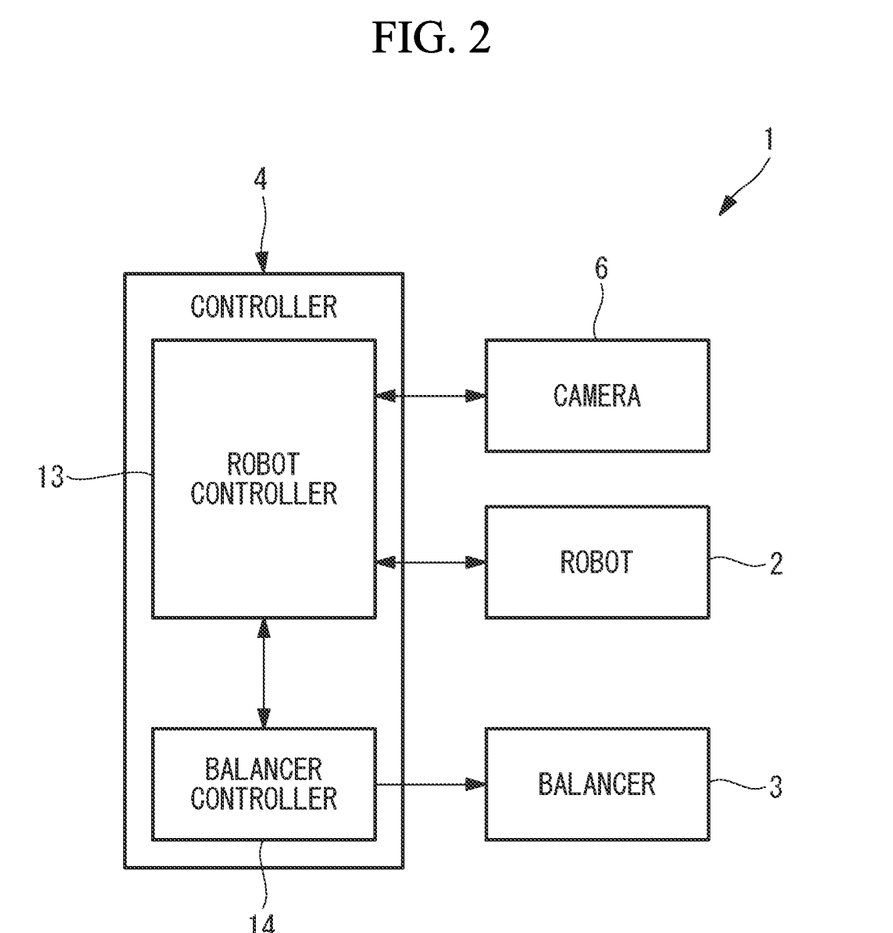
FIG. 2 is a block diagram showing the workpiece transfer system of FIG. 1.

As shown in FIG. 2, the controller 4 includes a robot controller 13 which controls the robot 2, and a balancer controller 14 which controls the balancer 3.

When a command to hold the workpiece W is sent by a transferring program, the robot controller 13 controls the robot 2 so as to place the camera 6 at a position above the workpiece W to obtain an image of a workpiece W by the camera 6. Also, the robot controller 13 extracts the shape of the workpiece W from the image obtained by the camera 6, and calculates a holding position of the workpiece W by the hand 5 by calculating a gravity center position of the workpiece W.

Also, the robot controller 13 controls the robot 2 so as to place the hand 5 at the calculated holding position and make the hand 5 hold the workpiece W. And, the robot controller 13 controls the robot 2 so as to lift the hand 5, and adjusts the holding position when a moment around a horizontal axis line detected by the force sensor exceeds a second threshold Th2, which is a predetermined threshold.

The holding position is adjusted by shifting the holding position along to the longitudinal direction of the workpiece W toward a direction in which the moment around the horizontal axis line detected by the force sensor becomes smaller. That is to say, the workpiece W is placed on the work support 7, the holding position of the hand 5 is adjusted with respect to the placed workpiece W, the workpiece W is held at the adjusted holding position, and then the workpiece W is lifted, which is repeatedly performed until the value of the moment detected by the force sensor becomes equal to or smaller than the second threshold Th2.

Figure 3:
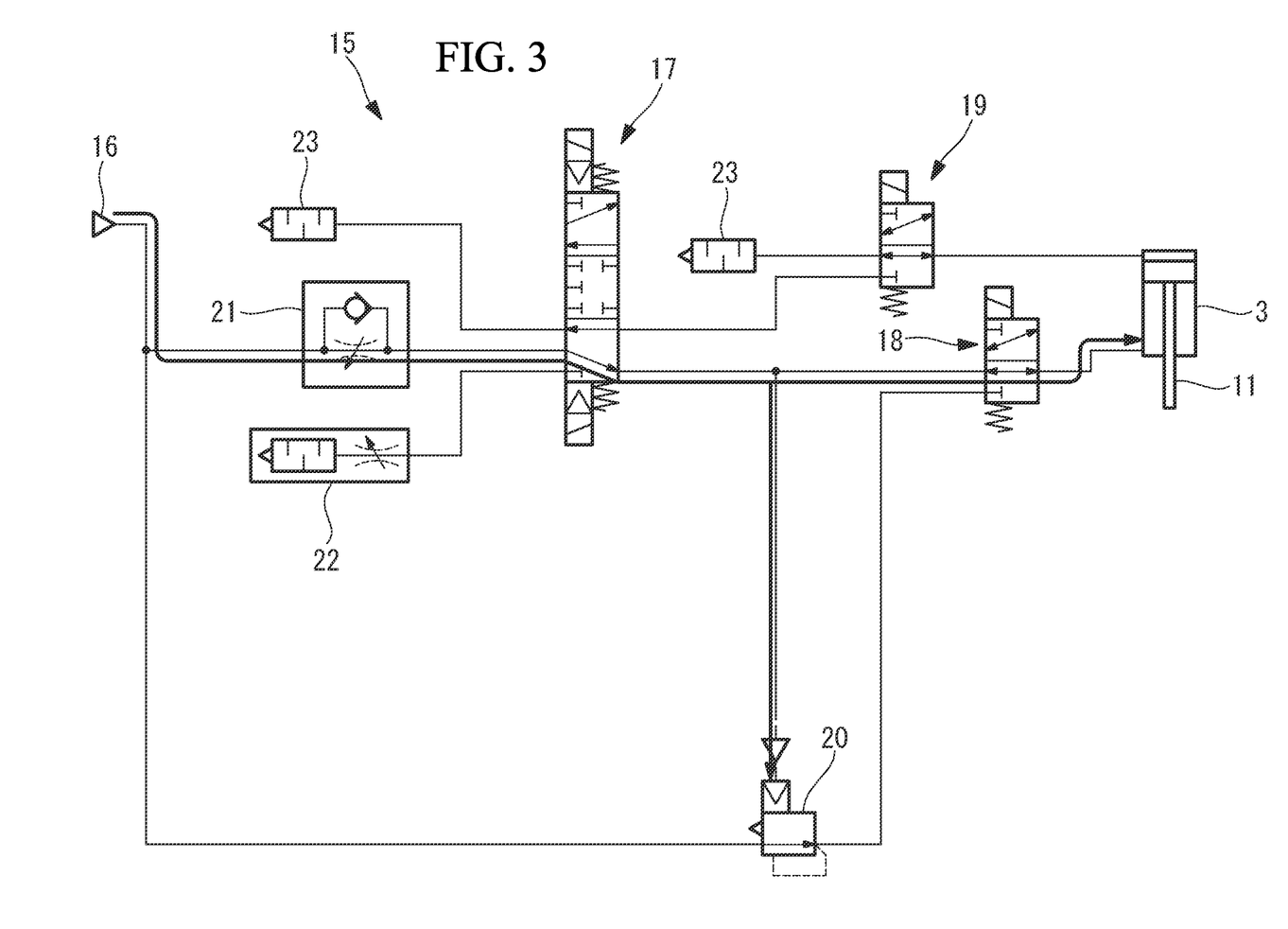
FIG. 3 is a diagram showing a pneumatic control circuit provided in a balancer controller of FIG. 2.

The balancer controller 14 includes a pneumatic control circuit 15 shown in FIG. 3, for example.

The pneumatic control circuit 15 includes a pneumatic power source 16, three valves 17, 18, 19, and a regulator 20. Symbol 21 is assigned to a speed controller, symbol 22 is to a throttle valve with silencer, and symbol 23 is to a silencer.

The balancer controller 14 adjusts the lifting force of the balancer 3.

The lifting force of the balancer 3 is adjusted so that an absolute value of the external force in a vertical direction detected by the force sensor becomes equal to or smaller than a fourth threshold Th4, which is a predetermined threshold, the external force is detected in a state where the hand 5 lifts the workpiece W by holding an appropriate holding position to make the workpiece W in a static condition.

Specifically, as shown in FIG. 3, the balancer controller 14 operates a first valve 17 and a second valve 18 so that air from the pneumatic power source 16 passes sequentially through the speed controller 21, the first valve 17, and the second valve 18, and supplies it to the rod 11 side of the balancer 3. By this, the rod 11 is lifted and the lifting force toward the upper side can act on the hand 5.

For example, the first valve 17 is turned on and off in a state where the workpiece W placed on the work support 7 is held at the adjusted holding position of the workpiece W by the hand 5. By this, the lifting force is intermittently increased until the external force in the vertical direction which is detected by the force censor reaches a third threshold Th3 which is a predetermined threshold. At this time, a set pressure value supplied to the regulator 20 becomes larger in a manner equal or similar to a pressure value supplied to the balancer 3.

Figure 4:
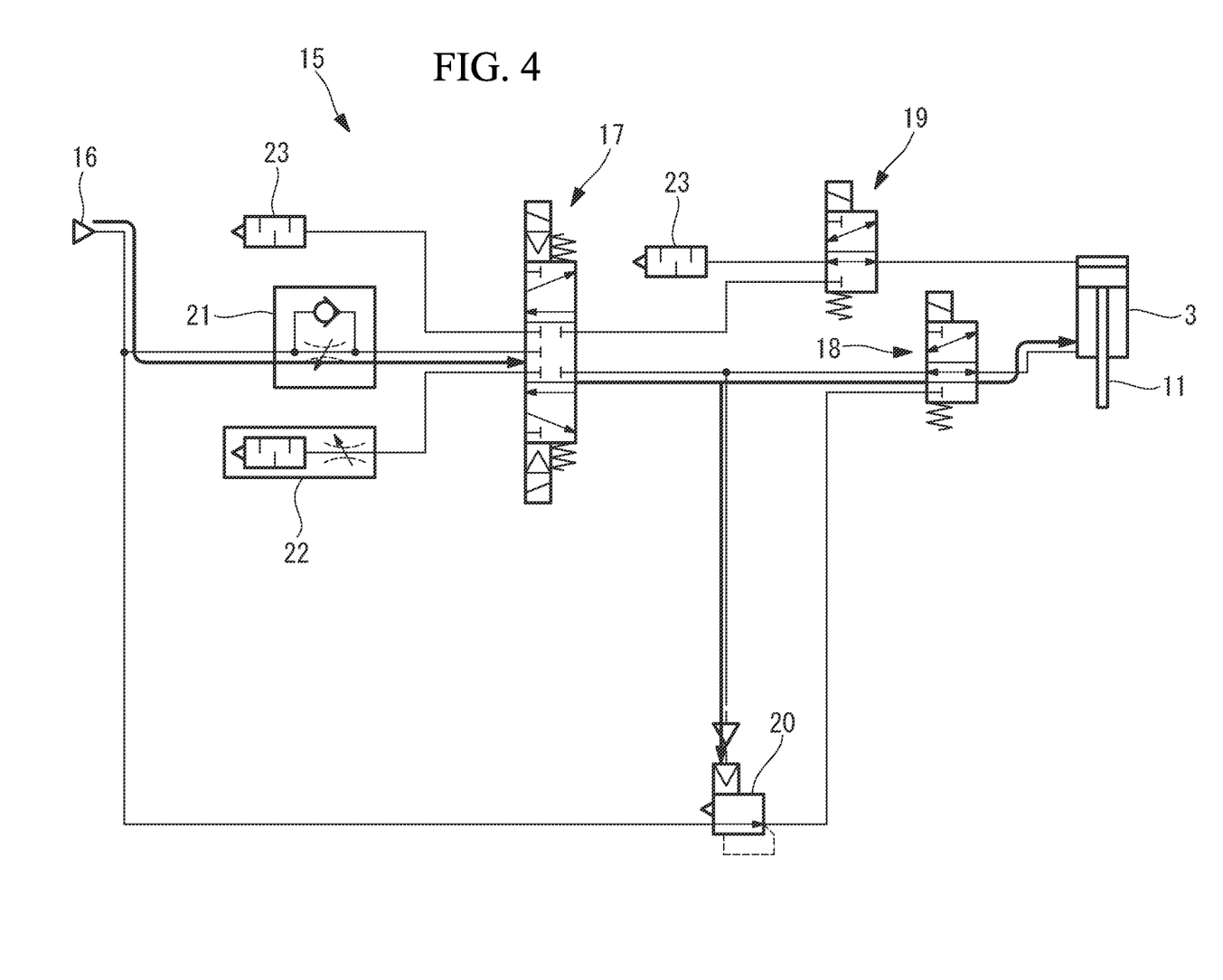
FIG. 4 is a diagram showing the pneumatic control circuit illustrating a state where a first valve of FIG. 3 is turned off.

At the point where the external force in the vertical direction detected by the force sensor exceeds the predetermined third threshold Th3, the first valve 17 is turned off and the robot 2 is controlled to lift the hand 5 by the robot controller 13. And, the balancer controller 14 determines whether or not the force in the vertical direction detected by the force sensor is equal to or smaller than a forth threshold Th4 which is a predetermined threshold.

Figure 5:
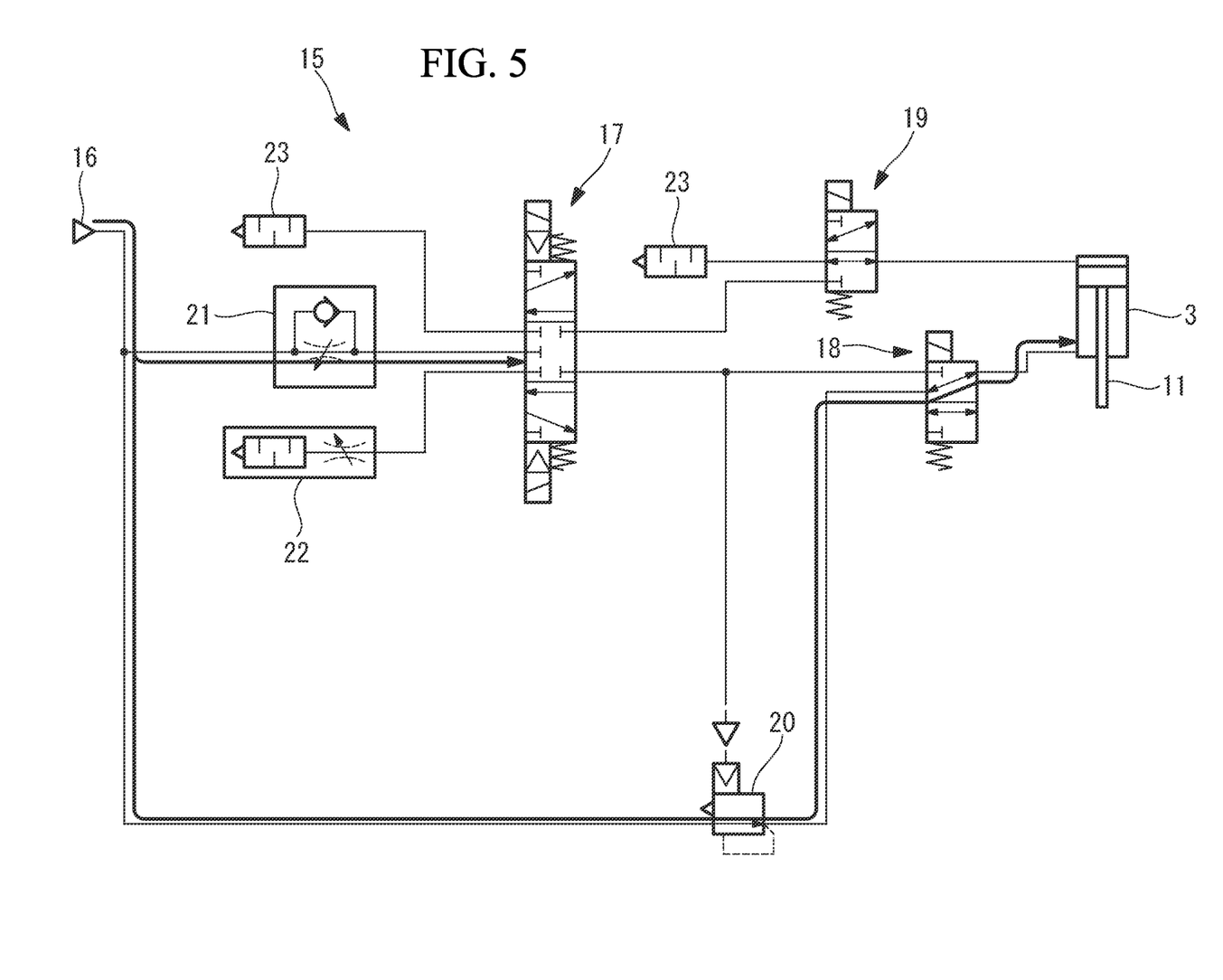
FIG. 5 is a diagram explaining a balanced state in the pneumatic control circuit of FIG. 3.

When the external force is not equal to or smaller than the fourth threshold Th4, the balancer controller 14 adjusts the pressure value applied to the balancer 3 by switching on/off the first valve 17. And, the balancer controller 14 switches on/off the second valve 18 as shown in FIG. 5 at the time when the external force detected by the force sensor in the vertical direction becomes equal to or smaller than the fourth threshold Th4.

Due to the aforementioned operation, the air pressure at a set pneumatic value which is set in the regulator 20 is supplied to the balancer 3. By setting a small enough value as the fourth threshold 4, it becomes possible to achieve a balanced state in which the force detected by the force sensor is substantially close to zero.

An operation of the workpiece transferring system 1 having the above described structure according to the present embodiment will be described below. In order to transfer a workpiece W whose weight and shape are unknown by using the workpiece transferring system according to this embodiment, the robot 2 is operated in the first place to place the camera 6 provided in the hand 5 at a position vertically above the workpiece W.

Figure 6:
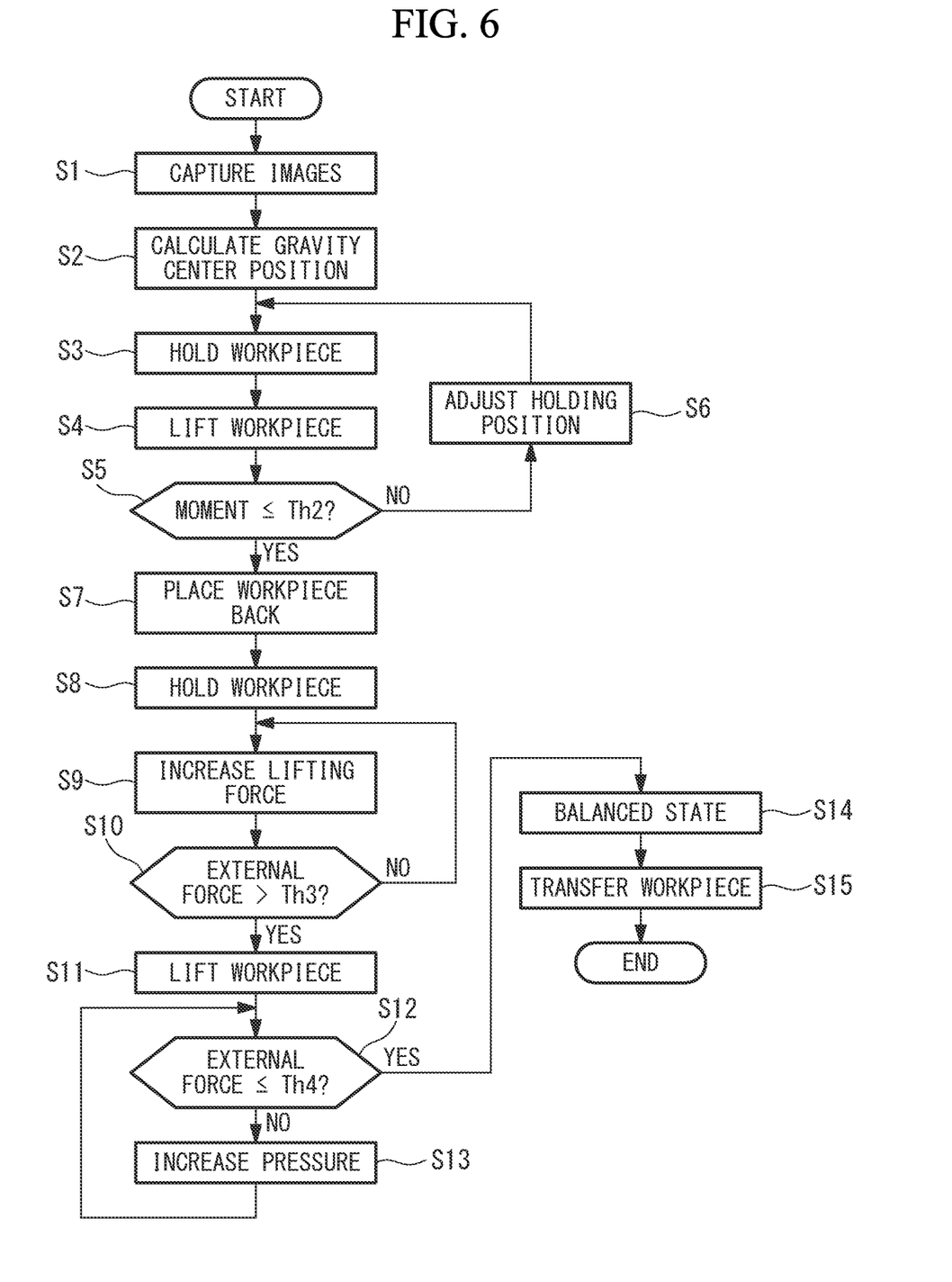
FIG. 6 is a flowchart explaining an operation for moving the workpiece by the workpiece transfer system of FIG. 1.

And, as shown in FIG. 6, the workpiece W is placed at a position within a field of vision of the camera 6 and the camera 6 captures an image of the workpiece W (step S1). The robot controller 13 processes the image so as to extract the workpiece W and calculate the gravity center position in the horizontal direction from the shape of the workpiece W in the plan view (step S2). The robot controller 13 sets the holding position of the workpiece W by the hand 5 in a posture in which the claw portions 8 of the hand 5 are arranged at both sides of the calculated gravity center position.

Then, the robot controller 13 holds the workpiece 5 by using the hand 5 (step S3), and lifts the hand 5 (step S4). At this time, the force in the three axis directions and the moments around the three axis lines acted on the hand 5 are detected by the force sensor. The robot controller 13 determines whether or not the moment around the horizontal axis line exceeds the second threshold Th2 or not (step S5), and when exceeded, the holding position is adjusted (Step S6), and the above steps from step S3 are repeatedly performed.

In a state where the holding positon is adjusted, the lifting force by the balancer 3 is adjusted.

Firstly, the workpiece W is placed back on the work support 7 (step S7), and held at the adjusted holding position by the hand 5 (step S8). In this state, the lifting force by the balancer 3 acts on the workpiece W so that the lifting force of the balancer 3 is increased until the external force detected by the force sensor exceeds the third threshold Th3 (Steps S9, S10).

At the point when the lifting force exceeds the third threshold Th3, the balancer controller 14 stops increasing the lifting force, and the robot controller 13 lifts the hand 5 (step S11). After that, whether or not the absolute value of the external force detected by the force sensor is equal to or smaller than the force threshold Th4 is determined (step S12), and when the external force exceeds the fourth threshold Th4, the lifting force by the balancer 3 is increased again (step S13).

Here, in order to make the absolute value of the external force detected by the force sensor equal to or smaller than the forth threshold Th4, it is necessary to adjust the pressure in a state where the workpiece W is being lifted. More specifically, when the robot controller 13 determines that the lifting force of the balancer 3 is necessary, the robot controller 13 sends a command to the first valve 17 in order to supply air and turns on the first valve 17. At this time, it is only an instant time period when the first valve 17 is in a turned-on state, then the robot 2 sends a command for shutting off the air so as to switch off the first valve 17. The regulator 20 records (saves) the pressure which is the same as or similar to that of the air from the second valve 18 to the balancer 3, and this pressure is kept being sent. By this, the absolute value of the external force detected by the force sensor is reduced to be equal to or smaller than the forth threshold Th4.

When the absolute value of the external force detected by the force sensor is equal to or smaller than the fourth threshold Th4, the balancer controller 14 sets the pressure at that time as the pressure of the regulator 20 and supplies air at the set pressure to the balancer 3. By this, the balancer 3 is in the balanced state (Step S14). Consequently, it is possible to reduce the load on the robot 2 to be minimum, and the robot 2 is capable of easily moving a workpiece W whose weight exceeds weight capacity (Step S15).

Accordingly, the workpiece transfer system 1 according to this embodiment is capable of moving the workpiece W in a state where the workpiece W is appropriately held and the load on the robot 2 is sufficiently reduced without registering information regarding the weight or a holding position of each workpiece W, which is advantageous.

Also, in this embodiment, the first threshold Th1 which is the threshold having a predetermined value can be used as the fourth threshold Th4, instead of setting a small enough values as the fourth threshold Th4. By this, the load in the vertical direction applied to the robot 2 can be reduced so as to be within a certain range, and the robot can easily move the load which exceeds the weight capacity.

Figure 7:
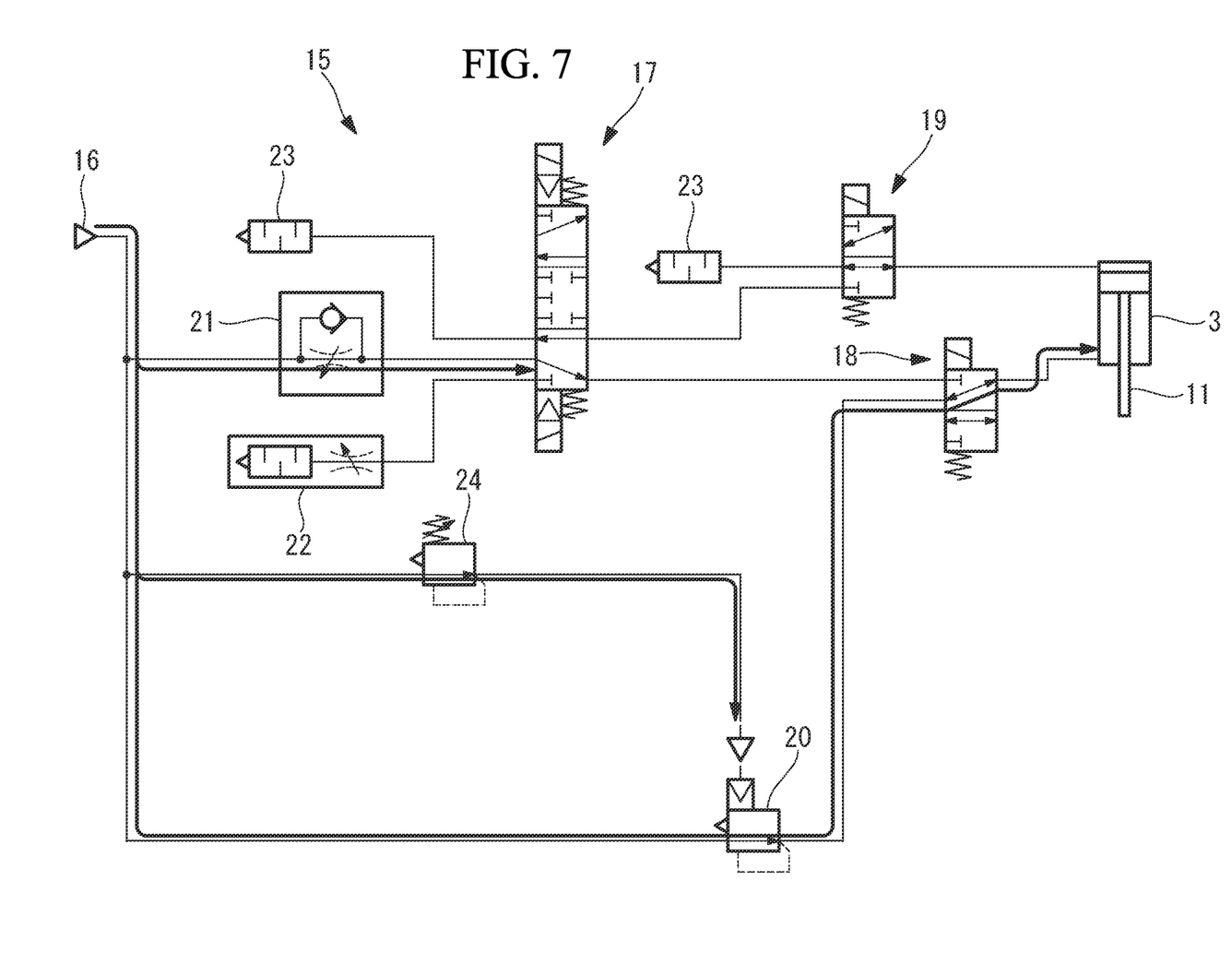
FIG. 7 is a diagram showing a modified example of the pneumatic control circuit of FIG. 2.

Also, the case where the lifting force generated by the balancer 3 is gradually increased so as to balance the force with the weight of the workpiece W is shown as an example, but instead of this, an air pressure control circuit 15 in FIG. 7 may be used.

That is to say, it is possible to employ an electro-pneumatic regulator 24 which can set the air pressure supplied to the balancer 3 from the regulator 20 by a command signal from outside.

Figure 8:
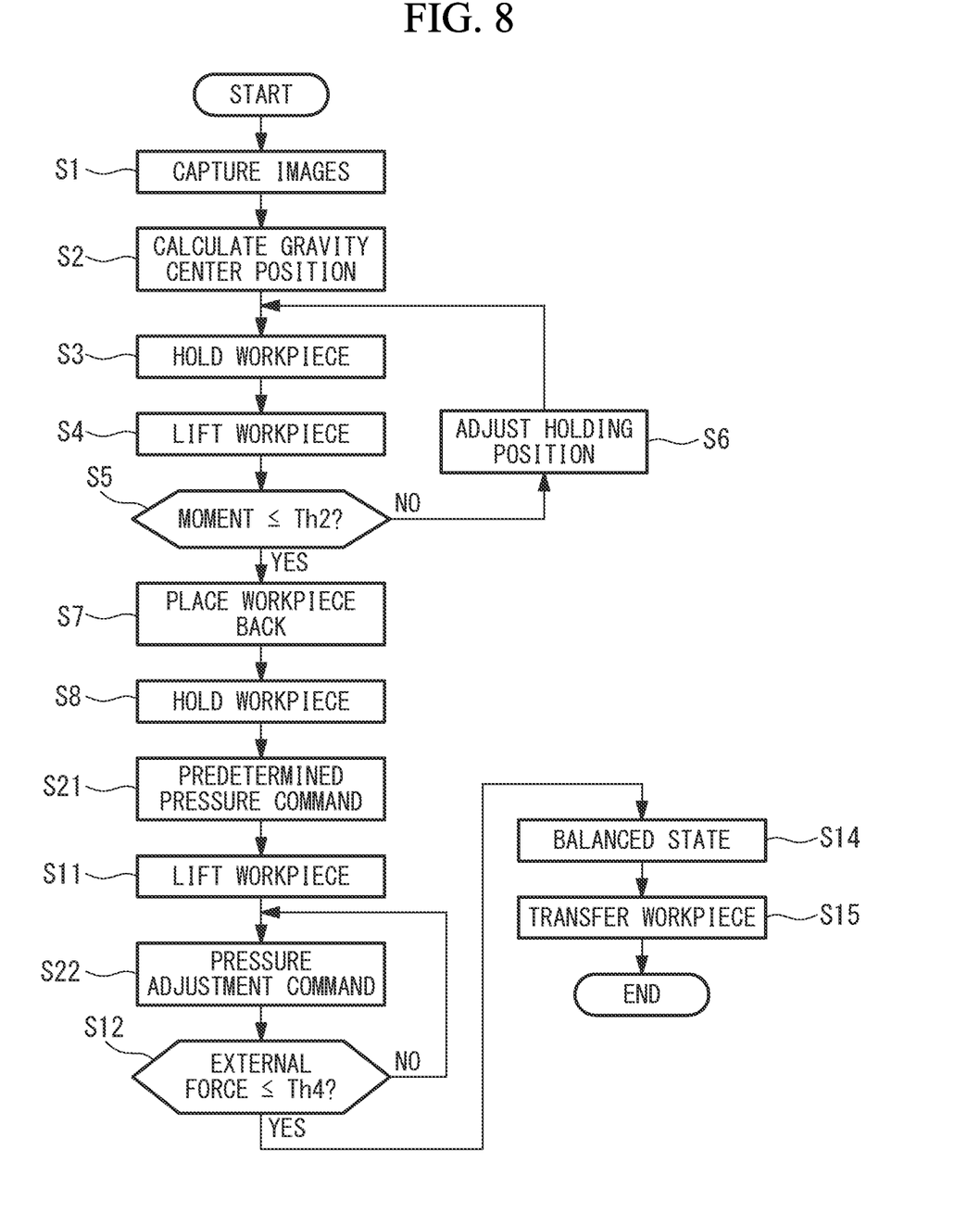
FIG. 8 is a flowchart explaining an operation for moving the workpiece by a workpiece transfer system having the pneumatic control circuit of FIG. 7.

Accordingly, as shown in FIG. 8, in a state where the hand 5 holds the workpiece W at the appropriate holding position (step S8), the balancer controller 14 commands the electro-pneumatic regulator 24 to supply a predetermined pressure value so that the balancer 3 generates the lifting force at a certain level (step S21). After that, the robot controller 13 controls the robot 2 so as to lift the hand 5 (step S11).

In this state, the balancer controller 14 calculates the pressure required to achieve the balanced state by the balancer 3 based on the value of the external force detected by the force sensor, and sends a command of the adjusted pressure to the electro-pneumatic regulator 24 (step S22). By this, the pressure of the balancer 3 is controlled by feedback control until the external force detected by the force sensor becomes equal to or smaller than the forth threshold Th4 (steps S12, S22).

Also, in this embodiment, the camera 6 provided in the hand 5 is used to calculate the gravity center position by capturing an image of the workpiece W in the plan view, however, instead of this, a distance sensor, an optical sensor, an ultrasonic sensor, or a temperature sensor may be used to detect shapes of the workpieces W.

Also, the force sensor may be provided in a mechanism portion of the robot 2, or a force sensor which is provided in the controller 4 and which estimates the external force from current value may be employed.

Moreover, in this embodiment, the air cylinder is illustrated as the balancer 3, however, any type of actuator, such as a pneumatic type, a hydraulic type, or an electrically-driven type may be employed instead.

And, in this embodiment, the long square column member whose cross section is uniform is illustrated as the workpiece W, however, a workpiece in any other shape may be employed instead.

Figure 9:
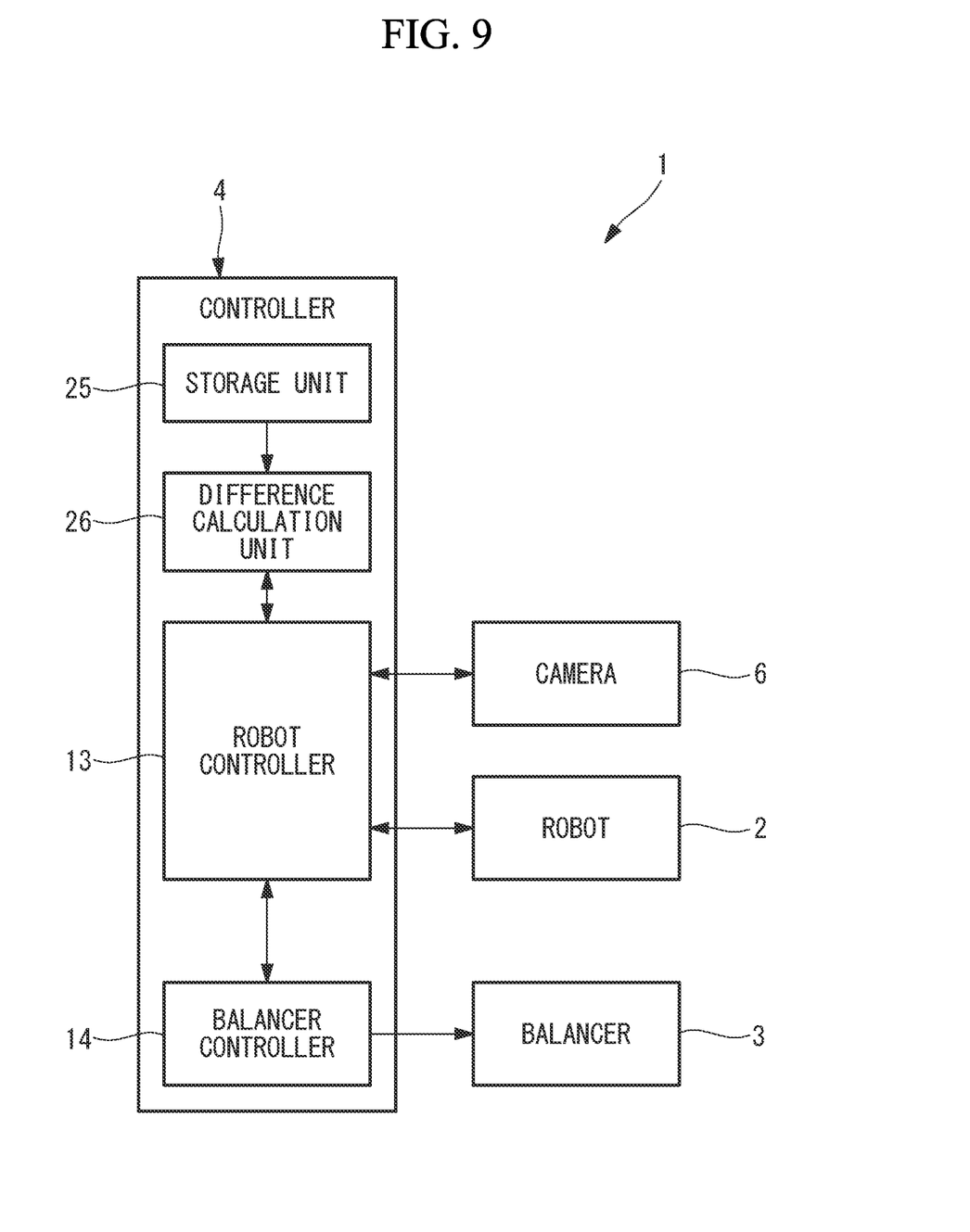
FIG. 9 is a block diagram showing a modified example of the workpiece transfer system of FIG. 2.

Also, as shown in FIG. 9, the controller 4 may include a storage unit 25 composed by a memory, and a difference calculation unit 26 composed by a processor. The storage unit 25 stores external forces in association with the coordinates of the TCP of the robot 2 in a time series manner, the said external forces are detected by the force sensor when a reference workpiece is being moved by the robot 2 with the transfer program for transferring the workpiece W.

The difference calculation unit 26 successively calculates the absolute value of difference between the external force detected by the force sensor and the external force stored in the storage unit 25 when moving the workpieces W which are the same as or similar to the reference workpiece in accordance with the same transfer program.

And, at each point of time during the transfer of the workpiece W based on the transfer program, when the absolute value of the difference calculated by the difference calculation unit 26 exceeds a fifth threshold Th5 which is a predetermined threshold, the robot 2 may be stopped.

The force sensor is used for detecting the external force in this embodiment, however, the other sensor may be employed instead of the force sensor. For example, a torque sensor is attached to each shaft of the robot 2 and it is possible to calculate data which is the same as or equal to that of the force sensor by using output of the torque sensor and a known technique.

Also, the images are processed in the robot controller 13 in the controller 4 in this embodiment, however, instead of this, the work transfer system 1 may include an image processing device outside the controller 4 and the image processing device may perform the image processing.

Also, in this embodiment, the coordinates of the TCP of the robot 2 is used as the position data which is stored in association with the external force in a time series manner, however, an encoder value of each shaft motor may be employed instead of the coordinates.

Also, in this embodiment, the camera 6 is controlled by the robot controller 13 so as to capture images, however, instead of this, a camera controller may be provided outside the controller 4 in the work transfer system 1 so as to control the camera 6 by the camera controller. In this case, it is preferable that the robot controller 13 and the camera controller can communicate with each other.

The invention claimed is:

1. A work transfer system, comprising:
a robot having a hand configured to hold a workpiece at a distal end of the robot and having a sensor capable of detecting external force acting on the hand;
a balancer connected to the hand that is configured to generate lifting force for lifting the hand in a vertically upward direction;
a shape measuring device which conducts measurement of a shape of the workpiece; and
a controller which controls the robot and the balancer based on the shape of the workpiece measured by the shape measuring device, wherein
the controller adjusts a holding position of the workpiece by the hand based on the shape of the workpiece measured by the shape measuring device, and controls the lifting force generated by the balancer so that an absolute value of the external force in a vertical direction detected by the sensor becomes equal to or smaller than a predetermined first threshold;
the controller is configured to adjust the holding position of the workpiece around a horizontal axis line detected by the sensor;

a moment of the workpiece becomes equal to or smaller than a predetermined second threshold when the robot holds, using the hand, the workpiece at the holding position;

the holding position is set based on the shape of the workpiece; and the workpiece is lifted.

2. The workpiece transfer system according to claim 1, wherein the controller controls the robot to hold, using the hand, the workpiece placed on a mounting surface at the adjusted holding position, the controller controls the balancer to increase the lifting force until the external force in a vertical direction detected by the sensor reaches a predetermined third threshold, and then the controller controls the robot to lift the hand until the absolute value of the external force in the vertical direction detected by the sensor reaches a predetermined fourth threshold.

3. The workpiece transfer system according to claim 1, wherein the controller controls the robot to hold, using the hand, the workpiece placed on a mounting surface at the adjusted holding position, the controller controls the balancer to generate the lifting force which makes the external force in the vertical direction detected by the sensor become a predetermined value, the controller controls the robot to lift the hand, and then the controller controls the balancer to change the lifting force by a difference which makes the external force in the vertical direction detected by the sensor becomes equal to or smaller than a predetermined fourth threshold.

4. The workpiece transfer system according to claim 1, wherein the controller comprises:

a storage unit which stores external forces in association with data of positions of the robot in a time series manner, the external forces being detected by the sensor when moving the workpiece by the robot based on a workpiece transfer program; and a difference calculation unit which calculates an absolute value of a difference between the external forces stored in the storage unit and external forces detected by the sensor when moving a workpiece, which is the same as the workpiece, based on the workpiece transfer program, wherein the controller stops the robot when an absolute value of the difference calculated by the difference calculation unit exceeds a predetermined fifth threshold.

* * * * *